United States Patent [19]

Leavines

[11] 4,100,673
[45] Jul. 18, 1978

[54] METHOD OF MAKING HIGH TEMPERATURE PARALLEL RESISTANCE PIPE HEATER

[76] Inventor: Joseph E. Leavines, P.O. Box 310, 2 Sierra Cir., New Braunfels, Tex. 78130

[21] Appl. No.: 813,445

[22] Filed: Jul. 7, 1977

Related U.S. Application Data

[62] Division of Ser. No. 683,299, May 5, 1977, Pat. No. 4,037,083.

[51] Int. Cl.² .............................................. H05B 3/00
[52] U.S. Cl. ..................................................... 29/611
[58] Field of Search ............. 29/611, 610 R; 338/214; 219/528, 529, 541, 544, 546, 549, 552, 553

[56] References Cited

U.S. PATENT DOCUMENTS

| Re. 26,522 | 2/1969 | Fessenden | 219/528 |
|---|---|---|---|
| 2,494,589 | 1/1950 | Sletner | 338/214 X |
| 2,528,966 | 11/1950 | Moore et al. | 338/214 X |
| 2,808,492 | 10/1957 | Yohe | 29/611 |
| 3,757,086 | 9/1973 | Indoe | 219/528 |

*Primary Examiner*—Victor A. Dipalma

*Attorney, Agent, or Firm*—George W. Rauchfuss, Jr.

[57] ABSTRACT

A high-temperature parallel-resistance pipe heater is described which is capable of being maintained at a high temperature level of approximately 600° F on a sustained basis and is capable of withstanding temporary occasional heating up to 1,000° F. A twisted pair of flexible electrical conductors with micaceous and fiberglass braid insulation layers have short segments stripped bare on alternate conductors at uniformly spaced intervals along their length, the conductors each including multiple fine nickel-clad copper strands, and a nickel-alloy resistance wire is helically wound around the twisted pair with two bights of the resistance wire engaging many of the strands in each bared segment for establishing numerous points of high unit area pressure contact at the junction between conductor and resistance wire. An anti-fraying agent on the fiberglass braid prevents the fibers from interfering with these points of contact. This assembly is enclosed with layers of micaceous and fiberglass braid insulation and sheathed in a metal tube to form a long length of heater cable which can be cut to length for making individual heaters as desired in the field.

2 Claims, 6 Drawing Figures

METHOD OF MAKING HIGH TEMPERATURE PARALLEL RESISTANCE PIPE HEATER

This is a division of application Ser. No. 683,299, filed May 5, 1977, now U.S. Pat. No. 4,037,083.

FIELD OF THE INVENTION

This invention is in the field of electrical heaters which are applied against the outside of pipes for maintaining the temperature of the piping in a desired range elevated above ambient. In particular this invention relates to a high temperature parallel resistance pipe heater capable of being maintained at a temperature level of approximately 600° F on a sustained basis and capable of withstanding temporary occasional heating up to 1,000° F. Such high temperature heater cable embodying the invention is well adapted for maintaining process temperatures up to about 500° F within the piping to which this heater cable is applied and is capable of being exposed to outdoor atmosphere weathering conditions or other adverse ambient atmospheres. The invention also relates to the method of making such durable high temperature parallel resistance pipe heaters.

BACKGROUND OF THE INVENTION

In many installations for carrying out processes in which fluids are flowing through pipes, it is desired to maintain the piping and the fluid being carried at a temperature level above that of the ambient. Often this is accomplished by applying electrical resistance heaters to the outside of the pipes.

The prior art involves two basic types of resistance arrangements. In series resistance heaters, the resistance wire extends the length of the heater and then back again to the input terminals forming two series-resistance legs as shown in FIG. 1. It is to be understood that in both FIGS. 1 and 2 the resistance wires in the heater cable are insulated from each other and from the piping to which this heater cable is applied. This series resistance type heater has the advantage that it is easy to manufacture, but it suffers the disadvantage that a break at any point in either leg of the resistance circuit will interrupt the flow of current to the whole cable.

Another disadvantage with this series resistance heater is that there is no way to shorten the length of a given heater cable without increasing its thermal output for a given applied voltage. For example assume an applied voltage E of 120 volts, and assume that the heater cable is 100 feet long with a total resistance of 12 ohms. The current flow is then 10 amperes and the heat output calculated by $I^2R$ is $(10 \text{ amperes})^2 \times (12 \text{ ohms}) = 1,200$ watts. Since the heater cable is 100 feet long, this means that the heat output is 12 watts per lineal foot of heater cable length.

If the heater cable is found to be too long for an installed pipe, the installation technician may wish to cut the cable length and rejoin the resistance wires at the cut end, as shown in FIG. 2. For example, if the cable is cut to 67 feet, the resistance becomes 8 ohms. The current flow for this same voltage E of 120 volts is now 15 amperes. The total heat output becomes $(15)^2 \times (8) = 1,800$ watts. Since the heater cable is now 67 feet long, the heat output has become 27 watts per foot which is more than twice the heat output per foot even though the cable was only shortened by one-third. This effect means that a series resistance type heater cable cannot as a practical matter in most cases be cut to length in the field.

The second type of resistance heater cable is a parallel resistance arrangement as shown in FIG. 3 in which the terminals 10 and 12 are connected to a pair of conductors 14 and 16. The resistance wire 18 is arranged with multiple segments or legs 21, 22, 23, 24, 25, etc. extending in parallel electrical relationship between the conductors 14 and 16. In this parallel resistance type of pipe heater cable the heat output per lineal foot of cable is not affected by the length to which the cable is cut. For example, if the output of the heater cable as shown in FIG. 3 is 12 watts per foot for a given applied voltage E, the heat output per foot of active cable at applied voltage E remains the same if it is shortened by cutting it off at the dotted lines 28 or 29 or elsewhere.

DISCUSSION OF THE PRIOR ART

U.S. Pat. No. 3,757,086 to W. J. Indoe discloses electrical heating cables of the parallel resistance type, but the Indoe cable is limited to operation at only moderate temperature levels and it has a low tolerance for thermal shock. The insulation covering around the conductor wires and the outer insulating jacket are formed of polytetrafluorine ethylene, polyvinyl chloride or any similar flexible plastic. If an attempt were made to operate the various embodiments of the Indoe cable at a temperature level of approximately 600° F on a sustained basis or with temporary heating up to 1,000° F the flexible plastic insulation would rapidly deteriorate or melt, while the electrical conductors and connections themselves would oxidize and deteriorate. Such oxidation of the conductors would tend to break contact away from or to deteriorate the electrical connections with the resistance wire. In fact the copper components themselves become brittle and suffer catastrophic oxidation as their temperature levels are raised much above 300° F.

U.S. Pat. No. 2,494,589 — P. G. Sletner describes an electrical heating cable of the parallel resistance type in which the heating wire is helically wound and extends along the cable concentrically between two copper conductor strips which are curved in the transverse direction so that they each partially curve around but are insulated from the heating wire. At spaced points along the heating wire, loops of it alternatively project out toward the respective conductor strips. Connection is made with these projecting loops by collapsing the arcuate conductor strip onto the projecting loop. The result is a complex heater cable construction with the conductors arranged as spaced strips acting like stiffening flanges, and the cable structure would be relatively rigid. The patentee concedes that there may be undue rigidity in this cable construction by teaching that in order for the cable to be easily flexible it may be provided with transversely extending depressions looking like notches. These depressions are located where the arcuate conductor strips are collapsed into contact with the projecting loops of the heater wire. There is no suggestion that this cable could be operated at a high temperature level of about 600° F on a sustained basis. Further, it appears that the collapsed copper strip contact regions would rapidly deteriorate, become brittle, suffer oxidation and come apart at a temperature level much above 300° F.

Another parallel resistance type heater cable described in this Sletner patent has a flat strip configuration. The conductors are U-shaped and embrace opposite edges of a strip core of insulating material. At each connection location the U-shaped conductors are provided with a pair of contact projections defining a groove between them. This assembly of the insulating core strip and the two U-shaped conductors is insulated by wrapping with two layers of cotton thread which are wound so that the pairs of contact projections are not covered. The resistance wire is wound over the cotton thread and passes through the grooves between the contact projections, and then the contact projections are pressed or flattened against the heating wire to form the contacts. There is no suggestion by the patentee that this flat strip cable could be operated at a high temperature level of at least 600° F on a sustained basis. The double cotton insulation layer, would rapidly deteriorate, carbonize or burn if the temperature were held much above 400° F for any period of time.

Norwegian Pat. No. 116,448 — P. G. Sletner is similar to the U.S. Sletner patent discussed above. It also discloses another strip embodiment of the heater cable in which a pair of insulated conductors extend along opposite edges of an insulated core strip. The insulation sleeves around these conductors are removed at spaced narrow gaps, and a resistance wire is wound around the assembly of the two insulated conductors and insulated core strip so that one turn of the resistance wire goes into each narrow gap. The resistance wire is soldered to the conductor in the gap. There is no disclosure or suggestion that any of the embodiments of the heater cable in this Norwegian patent is adapted to be operated at a temperature of approximately 600° F on a sustained basis. Copper conductors become brittle and begin to oxidize severely at temperatures much above 300° F. Also, in this embodiment with the soldered connections between the resistance wire and the conductors, there would be rapid deterioration of the conductors and of the solder joints at such a high temperature, and it would not be capable of withstanding temporary occasional heating up to a temperature level of 1,000° F.

SUMMARY OF THE INVENTION

The present invention overcomes the problems of the prior art by providing a high temperature parallel resistance pipe heater which is capable of being maintained at a high temperature level of approximately 600° F on a sustained basis and is capable of withstanding temporary occasional heating up to 1,000° F. The invention also provides a practical method of making durable high temperature parallel resistance pipe heaters of relatively great length. Thus the user can purchase the heater cable in rolls of relatively long lengths. Then each individual heater can but cut to the desired length in the field for application to each particular length of installed piping, while the heating power output per foot, i.e. watts per foot, remains the same by virtue of the fact that the segments of the resistance wire are connected in parallel electrical relationship. Moreover, the resultant cable as made by this method is capable of being exposed to outdoor atmosphere weathering conditions or other adverse ambient atmosphere.

The objects, features and advantages of the invention and its various aspects will become more fully understood from a consideration of the detailed description below in conjunction with the accompanying drawings.

DETAILED DESCRIPTION OF PRESENTLY PREFERRED EMBODIMENTS

Figure 4:
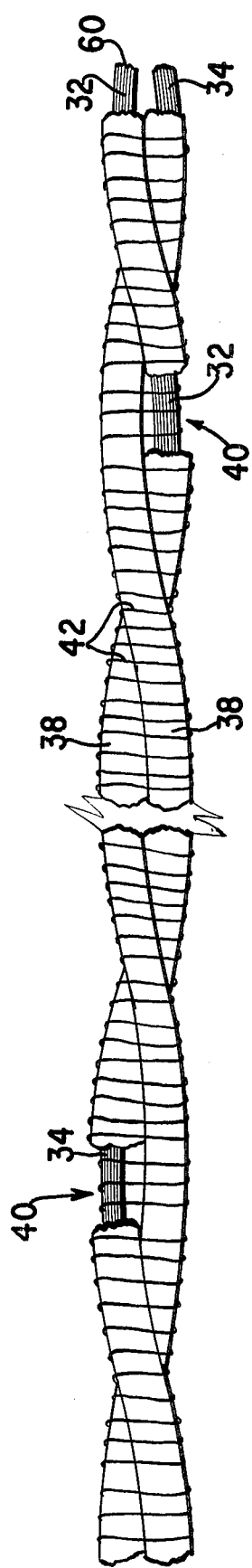
FIG. 4 illustrates a parallel resistance pipe heater partially constructed in accordance with the method of the present invention.
Figure 6:
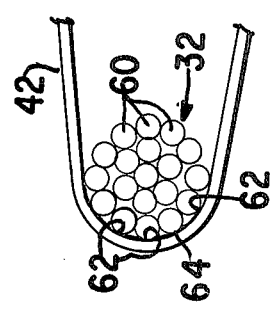
FIG. 6 is a further enlarged view for purposes of explanation showing the connection between the resistance wire and one of the electrical conductors.
Figure 5:
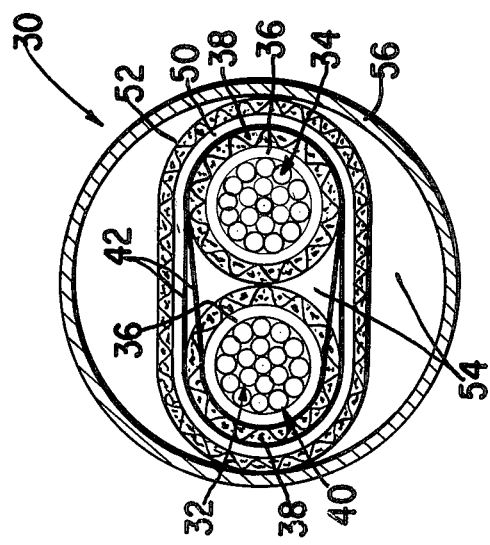
FIG. 5 is an enlarged cross-sectional view of a parallel resistance heater cable embodying this invention.

As shown in FIGS. 4, 5 and 6, a high temperature parallel resistance pipe heater 30 embodying the present invention is made by using a pair of inorganic fiber insulated multiple strand high conductivity conductors 32 and 34. These conductors 32 and 34 are each formed by numerous strands of copper wire and each of the individual strands is coated with nickel cladding.

An inorganic primary insulation layer 36 of micaceous insulation is individually wrapped around each of the conductors 32 and 34. This primary micaceous insulation layer is formed of fiberglass-backed mica tape which is available commercially from the Insulating Materials Department of General Electric Company of Schenectady, New York, 12306, under the product designation Mica Paper Tape Grade 77925. This tape layer 36 is applied mica side in with the fiberglass backing facing out. Overlying this primary insulation layer is applied a secondary insulation layer 38 of tightly braided fiberglass threads. This fiberglass braid layer serves to hold the micaceous insulation layer firmly in place and also contributes to the insulative characteristics. A suitable fiberglass thread for this braiding can be obtained from Owens-Corning Fiberglass Corporation of Houston, Texas 77008, under the commercial designation ECG 150 1/2.

As an example which works to advantage the nickel clad copper conductors 32 and 34 are American Wire Gage No. 12 each comprising nineteen or more strands. The numerous strands in each conductor are preferred for providing a relatively good flexibility and for providing multiple points of contact thereby maintaining good contact between these conductors and the resistance wire at the contact junctions, as will be explained in detail further below. The fiberglass threads comprising the braided secondary insulation layer 38 are applied as reasonably tightly as possible consistent with a minimum amount of breakage during the braiding operation. Moreover, these threads are coated with a silicone anti-fraying agent before they are braided which is obtainable as a silicone solution from General Electric Company as type SR-324.

This anti-fraying treatment of each strand before the braiding operation is carried out is desired to prevent fine frayed glass pieces from interferring with the formation of good contact at the contact junctions, as will be explained further below.

After the braiding operation has been completed, the insulated conductors are stripped bare of insulation along a short segment 40 at uniformly spaced intervals along the length of each. As an example, these bare segments have a length in the range from ⅜ to ¾ of an inch and are spaced apart by uniform intervals of a length in the range from 3 to 5 feet. Then the two stripped conductors are laid side-by-side with the bared segments 40 of one conductor located mid-way between the bared segments 40 of the other conductor, as seen in FIG. 4.

The two conductors are twisted together for securing them against longitudinal slippage of one with respect to the other. This twisting assures that in the twisted wire assembly each of the bared segments is held in the same relationship with respect to its neighbors and provides uniform flexibility in all directions of the completed heater cable.

An alloy resistance wire 42 is now helically tightly wrapped around the assembly of the two twisted wires, as shown in FIG. 4. The helical wrapping of the resistance wire 42 has its convolutions uniformly spaced along the length of the twisted assembly and is arranged so that at least two convolutions are wound into each of the bared segments 40 for forming a contact junction therein with the bared conductor 32 or 34 as the case may be. As examples this nickel-alloy resistance wire 42 may be relatively fine, such as AWG No. 38 of the alloy called "Tophet C" obtainable from Wilbur B Driver Company or of the alloy called "Nichrome" obtainable from Driver-Harris Company.

It is to be understood that the particular wire gage and nickel alloy which are used for the resistance wire 42 may be changed as desired to meet the applied voltage conditions and required wattage output per foot in a given installation. The above examples are illustrative of typical ones which can be used to advantage in many applications.

After the resistance wire 42 has been wound onto the twisted pair of insulated conductors, as shown in FIG. 4, another inorganic insulation layer 50, which is formed by the fiberglass-backed mica tape discussed above, is wrapped around the assembly of twisted conductors and the resistance wire element. Then, an outer jacket 52 of braided fiberglass threads is tightly braided over the micaceous insulation layer 50 to hold it in place and to contribute additional electrical insulation effect. The fiberglass threads in the braided jacket 52 are coated with an anti-fraying silicone solution, as discussed above.

The regions 54 between the insulated conductors 32 and 34 may be filled, if desired, with inorganic material capable of withstanding the operating temperatures, for example such as asbestos. The purpose of such filling material 54 is to make the over-all twisted conductor assembly more nearly cylindrical for convenience in applying the micaceous tape layer 50.

To provide a protective sheath 56 the fiberglass braid jacketed assembly is inserted into an alloy metal tube 56, preferably of stainless steel. Other metal alloy tubes may be used, depending upon the environment in which the heater cable is intended to be applied. However, the stainless steel tube 56 is the most suitable for the large majority of installations, including use under outdoor weathering conditions. Moreover, the stainless steel sheath readily withstands the high operating temperatures discussed above.

Figure 1:
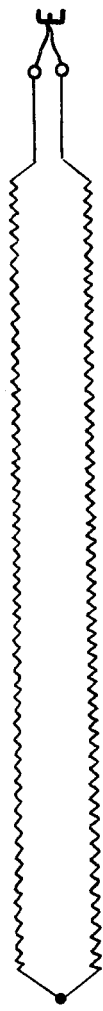
FIG. 1 is a schematic circuit diagram of a series resistance pipe heater of the prior art.
Figure 2:
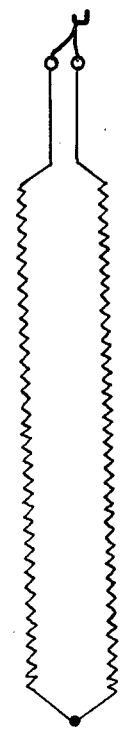
FIG. 2 is a schematic circuit diagram of this same heater after it has been cut down to two-thirds of its original length with the result that the wattage output per foot of cable length more than doubles.
Figure 3:
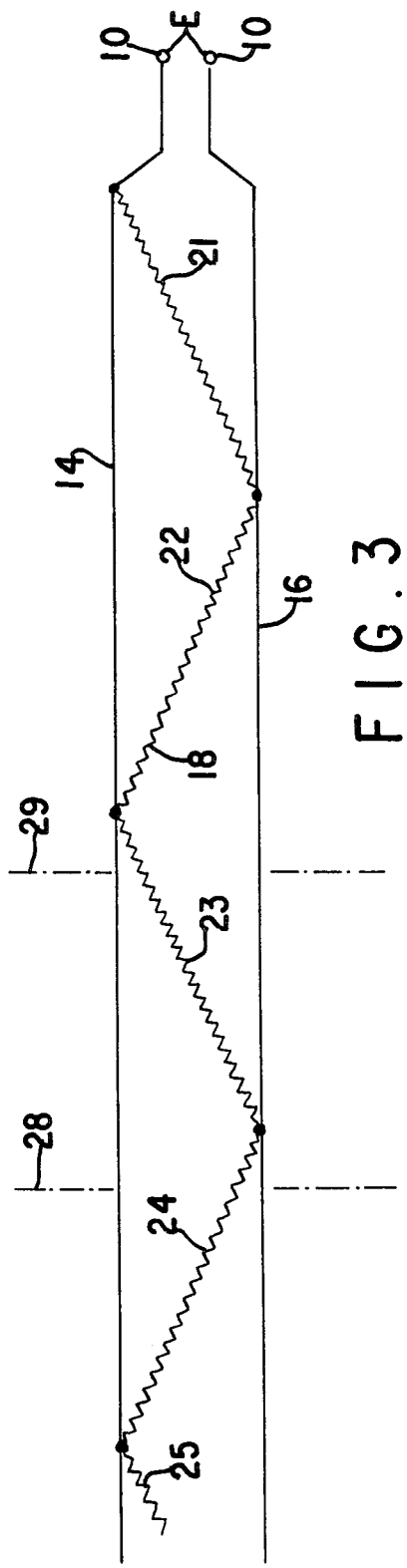
FIG. 3 is a schematic circuit diagram of a parallel resistance pipe heater.

This metal sheathed heater cable 30 is desirably manufactured in relatively long lengths supplied in rolls. The installer cuts the cable to length, as discussed in connection with FIG. 3, to make individual heaters suitable for application to the various lengths of the installed piping to be heated.

By virtue of the fact that there are a relatively large number (at least 19) of the fine nickel-clad copper strands 60 forming each of the conductors 32 and 34, there are numerous points of electrical contact 62 provided between the bight 64 of the resistance wire 42 pressing against the respective conductor, such as the conductor 32 shown in FIG. 6. This redundancy of the contact points 62 assures that a good electrical connection, i.e. a reliable junction, is made (and is maintained under operating conditions) between the respective conductor 32 and the resistance wire 42. Since a relatively small diameter resistance wire is pressing against multiple small diameter conductor strands 60, the per unit area pressure is relatively high, which further assures that a good electrical connection is made and maintained at each point of contact 62. In addition the nickel coating on the strands 60 serves as a transition between the high specific resistivity of the resistance wire 42 and the very low specific resistivity of the copper strands for causing more uniform current distribution throughout the points of contact. The nickel cladding protects the surfaces of these copper strands 60 from the catastrophic oxidation and brittleness which occur when conventional bare copper is raised to a temperature much above 300° F. Thus the contact points 62 do not deteriorate at elevated temperature. Also, there are at least two bights 64 of the resistance wire passing around each uninsulated segment of the conductor which further increases the number of individual contact points comprising the junction. Therefore, a low current flow occurs through each of the contact points 62 because a relatively large number of them share in carrying the current. This low current flow helps in assuring a dependable long life for the heater cable since localized hot spots are avoided at the points of contact.

It was mentioned that an anti-fraying coating is applied to the fiberglass strands forming the secondary layer 38. A purpose is to prevent individual fibers of the fiberglass threads from fraying into the uninsulated segments at the time of stripping the insulation where the glass fibers might become lodged between the conductor filaments 60 and the bight of the resistance wire 42 being wound thereon, thereby inadvertently preventing the proper contact from being made between the bight and the individual nickel clad strands 60. Once the heater cable has been assembled with the high unit area pressure points of contact 62 having been formed, the anti-fraying coating does not serve any further purpose, for any subsequently loosened glass fibers do not seem to interfere with these points of contact after they have once been firmly established as described above.

Another advantage of the heater cable construction as discussed is its ability to continue proper functioning even though the cable may become bent during installation. The numerous contact points 62 with high unit area pressure and good contact characteristics assure that the junction between the conductor and the resistance element remains sound even in the case of a bend occurring in the localized region of the bared conductor segment. Thus, a durable, dependable heater cable is provided of the parallel resistance type and having the capability of operating at a temperature of about 600° F on a sustained basis and even capable of withstanding occasional temporary heating of the resistance wire 42 up to a temperature of 1,000° F.

I claim:

1. The method of making a high-temperature parallel-resistance sheathed pipe heater cable capable of being operated at a temperature level of approximately 600° F on a sustained basis and capable of withstanding temporary occasional heating up to 1,000° F comprising the steps of providing a pair of flexible electrical conductors each including at least nineteen fine strands of nickel-clad copper wire, wrapping a primary layer of micaceous insulation around each of said conductors, braiding a secondary insulation layer of fiberglass threads tightly over said primary layer, said threads each being coated with an anti-fraying agent, stripping short sections of both primary and secondary insulation layers from said conductors at uniformly spaced intervals to expose bared segments of the conductors, each of said bared segments having the same predetermined length and being spaced from its neighbors by an interval of the same predetermined length, positioning said pair of stripped insulated conductors side-by-side with the bared segments of one being located mid-way between the bared segments of the other, twisting said pair of conductors together to form a twisted pair for holding the two conductors in position with the bared segments of one conductor alternating in occurrence with the bared segments of the other conductor along the twisted pair, helically wrapping a nickel-alloy resistance wire around said twisted pair of conductors with at least two bights of the resistance wire engaging each of said bared conductor segments for providing a multiplicity of contact points of high unit area pressure where each of said bights of the nickel-alloy resistance wire presses against the nickel-clad surfaces of the fine copper strands, wrapping another layer of micaceous insulation over said helically-wound resistance wire, braiding an outer jacket of fiberglass threads tightly over said latter micaceous insulation layer to form a jacketed heater cable assembly, and inserting said assembly into a stainless steel tube to form the sheathed heater cable.

2. The method of making a high-temperature parallel-resistance sheathed pipe heater cable as claimed in claim 1 in which:

said conductors are bared along a length in the range from ⅜ to ¾ of an inch to form said bared segments which are spaced apart along each conductor by a distance in the range from 3 to 5 feet.

* * * * *